C. Wheeler Jr.
Harvester Rake.

No. 15311            Patented July 8, 1856.

UNITED STATES PATENT OFFICE.

C. WHEELER, JR., OF POPLAR RIDGE, NEW YORK.

IMPROVEMENT IN RAKING ATTACHMENTS FOR HARVESTERS.

Specification forming part of Letters Patent No. 15,311, dated July 8, 1856.

*To all whom it may concern:*

Be it known that I, C. WHEELER, Jr., of Poplar Ridge, in the county of Cayuga and State of New York, have invented a new and Improved Raking Attachment for Harvesters; and I do hereby declare that the following is a full, clear, and exact description of the same, reference being had to the annexed drawings, making a part of this specification, in which—

Figure 1:
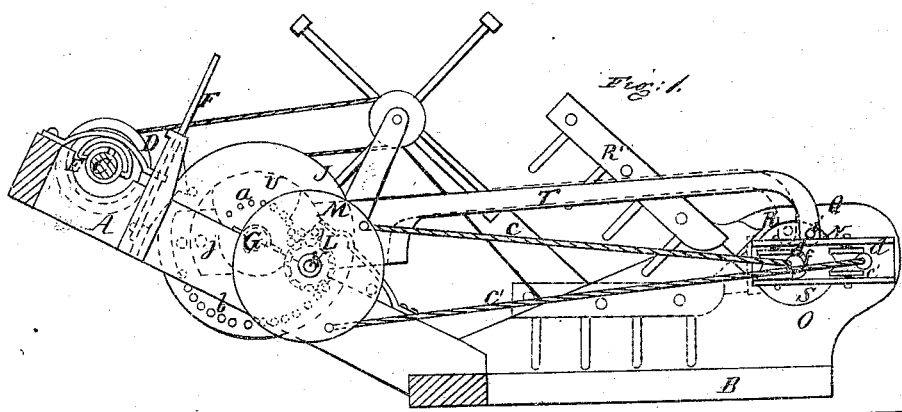
Figure 2:
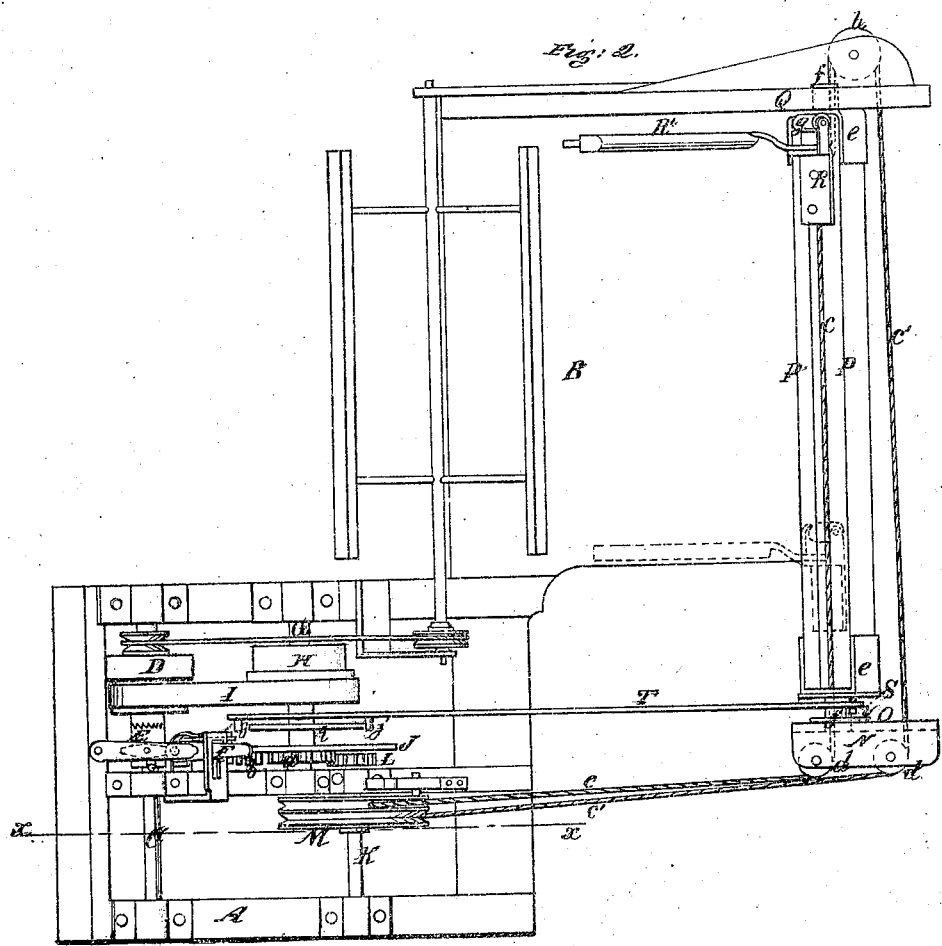

Figure 1 is a side view of my improvement applied to a harvester, the framing of the machine being bisected, as indicated by x x, Fig. 2. Fig. 2 is a plan or top view of the same.

Similar letters of reference indicate corresponding parts in the two figures.

My invention consists in the peculiar means employed for operating a reciprocating rake, whereby said rake is made to descend in a horizontal position and rake the cut grain off one end of the platform with a quick movement and then ascend or rise and pass back to the opposite end with a moderate movement, during which time the platform is again filled with grain and the rake lowered and ready for the succeeding rapid stroke to sweep or rake the grain off of the platform.

To enable those skilled in the art to fully understand and construct my invention, I will proceed to describe it.

A represents the main frame of a harvester, to the back end of which frame a platform, B, is attached. The frame A is of rectangular form, and has a shaft, C, placed transversely on its front part. This shaft is the axle of the driving-wheel. No driving-wheel is represented, however, as it is not essential. On the axle or shaft C there is placed loosely a cone of pulleys, D, which are connected to the shaft C, when necessary, by a clutch, E, operated by a lever, F.

G is a shaft, also placed on the frame A, and having a cone of pulleys, H, permanently attached to it, a belt, I, passing around the two cones of pulleys D H. On one end of the shaft G there is placed a circular disk, J, having two sets or series of teeth, a b, upon one side. The teeth a are placed near the center of the disk, and in the form of a semicircle. The teeth b are near the periphery of the disk J, and are placed so as to form a segment of a circle the center of which is the same as that of the disk J and the semicircle in which the teeth a are placed.

K is a shaft, also placed on the frame A. This shaft has a pinion, L, on its inner end, said pinion gearing alternately into the teeth a b. M is a pulley placed on the shaft K. This pinion has two grooves formed in its periphery, and two cords or chains, c c', are attached to it. These cords or chains pass around pulleys d d, which are fitted in a block, N, at the end of an arm, O, attached to one side of the platform B at its back part.

P P represent two ways or guides, which are connected at the ends by metal straps e, which have each a hollow journal, f, attached to them. One of these journals has its bearings in the arm O and in line with the space between the two pulleys d d. The other journal has its bearing in a ledge, Q, attached to the side of the platform A.

Between the two ways P P a slide, R, is fitted, said slide being allowed to work freely back and forth between the ways, a friction-roller, g, being attached to the slide, said roller bearing against one side of the ways and preventing friction. One of the ropes or chains, c, passes through the hollow journal f in the arm O, and is attached to the end of the slide R. The other rope or chain, c', passes around the back of the ways or guides P P and around a pulley, h, and through the journal f in the ledge Q, and is attached to the opposite end of the slide R. To the slide R there is attached a rake, R', which projects over the platform B.

To the journal f, which works in the arm O, there is attached a circular disk, S, and this disk has one end of a rod, T, attached to it near its periphery by a pivot, i. The opposite end of the rod T has two pins, j j, attached to it at one side. On the shaft G, and near the disk J, there is placed a cam, U, formed of the portions of two circles, as shown by the dotted lines in Fig. 1. This cam works between the two pins j j on the rod T.

The operation is as follows: Suppose the rake R' to be at the outer end of the platform A, as shown in Fig. 2. At this point the teeth b will gear into the pinion L, and the rope or chain c will draw the slide R and rake R' across the platform in the direction indicated by the arrow 1, and will rake the grain off the end of the platform. When the rake reaches this point the cam U will actuate the rod T, and said rod will then turn the ways P P, so that the rake R' will be raised clear of the platform, as shown in black, Fig. 1, and the teeth *a* will then gear into the pinion L, and the slide R and rake R' will be moved to the outer end of the platform with a comparatively slow movement, as the teeth *a* form a portion of a considerably-smaller circle than the teeth *b*. When the rake reaches the outer end of the platform the cam U again actuates the rod T, and the ways or guides P P are turned sufficiently to depress the rake R' and cause it to assume a horizontal position. The teeth *b* then again gear into the pinion L, and the rake is moved toward the inner end of the platform, raking off the grain. The slow movement of the rake from the inner to the outer end of the platform is necessary in order to allow the platform time to be filled with grain by the time the rake reaches its outer end, and the quick opposite movement is necessary in order to prevent the rake interfering with the cut grain as it passes upon the platform. A short space is allowed between the end teeth, *a b*, in order that the pinion L may have a short "dwell" or rest previous to each change of movement, so that the cam J will have time to actuate the rod T and raise and lower the rake R' at the ends of its strokes previous to its movement. The reciprocating rakes now used require a complicated device to raise and lower the teeth so that they will be free from the platform while passing back to the outer end of the platform. My improvement is simple, and works with but little friction, and is not liable to get out of repair.

I do not claim a reciprocating rake operated by the cords attached to a pulley, M, having a reciprocating rotary motion, irrespective of the mode of operating said pulley and the arrangement of the rake; but What I do claim as new, and desire to secure by Letters Patent, is—

The disk J, with the teeth *a b*, attached and gearing into a pinion, L, on the shaft K of the pulley M, in combination with the cam U, rod T, and guides or ways P P, between which the slide R, to which the rake R' is attached, works, the above parts being arranged and operating as shown, for the purpose specified.

C. WHEELER, JUNIOR.

Witnesses:
H. W. TAYLOR,
JAMES NIBLO.